US008462743B2

(12) United States Patent
Kovacs et al.

(10) Patent No.: US 8,462,743 B2
(45) Date of Patent: Jun. 11, 2013

(54) METHOD, APPARATUS AND COMPUTER PROGRAM FOR SIGNALING CHANNEL QUALITY INFORMATION IN A NETWORK THAT EMPLOYS RELAY NODES

(75) Inventors: Istvan Z. Kovacs, Aalborg (DK); Bernhard Raaf, Neuried (DE); Oumer Teyeb, Aalborg (DK); Vinh V. Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 1006 days.

(21) Appl. No.: 12/011,330

(22) Filed: Jan. 25, 2008

(65) Prior Publication Data
US 2009/0191882 A1 Jul. 30, 2009

(51) Int. Cl.
*H04W 4/00* (2009.01)

(52) U.S. Cl.
USPC .......................................... 370/338; 370/332

(58) Field of Classification Search
None
See application file for complete search history.

(56) References Cited

U.S. PATENT DOCUMENTS

| | | | |
|---|---|---|---|
| 6,317,584 B1 * | 11/2001 | Abu-Amara et al. | 455/12.1 |
| 7,688,798 B2 * | 3/2010 | Dottling et al. | 370/345 |
| 2004/0100898 A1 * | 5/2004 | Anim-Appiah et al. | 370/210 |
| 2005/0141541 A1 * | 6/2005 | Cuny et al. | 370/437 |
| 2006/0240859 A1 * | 10/2006 | Gervais et al. | 455/522 |
| 2006/0270341 A1 * | 11/2006 | Kim et al. | 455/16 |
| 2006/0281404 A1 * | 12/2006 | Lee et al. | 455/11.1 |
| 2006/0285558 A1 * | 12/2006 | Dottling et al. | 370/506 |
| 2007/0097945 A1 * | 5/2007 | Wang et al. | 370/349 |
| 2007/0160014 A1 * | 7/2007 | Larsson | 370/338 |
| 2007/0207810 A1 * | 9/2007 | Cho et al. | 455/450 |
| 2007/0264932 A1 * | 11/2007 | Suh et al. | 455/13.1 |
| 2008/0057969 A1 * | 3/2008 | Agami et al. | 455/450 |
| 2008/0095037 A1 * | 4/2008 | Chang et al. | 370/204 |
| 2008/0112365 A1 * | 5/2008 | Kwun et al. | 370/332 |
| 2008/0125136 A1 * | 5/2008 | Song et al. | 455/452.1 |
| 2008/0130711 A1 * | 6/2008 | Catreux-Erceg et al. | 375/130 |
| 2008/0220790 A1 * | 9/2008 | Cai et al. | 455/450 |
| 2008/0225783 A1 * | 9/2008 | Wang et al. | 370/329 |
| 2008/0227461 A1 * | 9/2008 | Dayal et al. | 455/452.2 |
| 2008/0285499 A1 * | 11/2008 | Zhang et al. | 370/315 |

(Continued)

FOREIGN PATENT DOCUMENTS

| | | |
|---|---|---|
| CN | 1239635 A | 12/1999 |
| EP | 1 030 528 A2 | 8/2000 |

(Continued)

OTHER PUBLICATIONS

"Discovering the Wireless World in a user friendly environment", Wireless World Initiative (WWI), Jun. 2006, 32 pgs.

(Continued)

*Primary Examiner* — Bunjob Jaroenchonwanit
(74) *Attorney, Agent, or Firm* — Harrington & Smith

(57) ABSTRACT

A relay node receives from user equipments UE CQI reports which give a CQI value per radio band resource RBR, from which are aggregated across the RBRs and/or aggregated per UE across that UE's RBR values. The relay node reports an indication of the average to its controlling access node (eNodeB), either explicitly or implicitly (e.g., a gain applied to the CQI of the downlink between the relay and access nodes). The relay node also checks the UEs' buffer status (actual or predicted) and reports either periodically or based on an underflow/overflow occurrence. For periodic reports, each UE buffer experiencing the overrun/underrun is reported.

23 Claims, 4 Drawing Sheets

U.S. PATENT DOCUMENTS

| | | | |
|---|---|---|---|
| 2009/0016290 A1* | 1/2009 | Chion et al. | 370/329 |
| 2009/0047898 A1* | 2/2009 | Imamura et al. | 455/7 |
| 2009/0061767 A1* | 3/2009 | Horiuchi et al. | 455/18 |
| 2009/0073916 A1* | 3/2009 | Zhang et al. | 370/315 |
| 2009/0116422 A1* | 5/2009 | Chong et al. | 370/315 |
| 2009/0131066 A1* | 5/2009 | Barve et al. | 455/452.2 |
| 2009/0147746 A1* | 6/2009 | Alay et al. | 370/329 |
| 2009/0161613 A1* | 6/2009 | Kent et al. | 370/329 |
| 2009/0163142 A1* | 6/2009 | Pi et al. | 455/62 |
| 2009/0185527 A1* | 7/2009 | Akhtar et al. | 370/329 |
| 2009/0191882 A1* | 7/2009 | Kovacs et al. | 455/450 |
| 2009/0196177 A1* | 8/2009 | Teyeb et al. | 370/231 |
| 2009/0227201 A1* | 9/2009 | Imai et al. | 455/7 |
| 2009/0238150 A1* | 9/2009 | Barrett | 370/335 |
| 2009/0257356 A1* | 10/2009 | Frederiksen et al. | 370/252 |
| 2010/0027481 A1* | 2/2010 | Lindh et al. | 370/329 |
| 2010/0034148 A1* | 2/2010 | Zhang et al. | 370/328 |
| 2010/0069110 A1* | 3/2010 | Lee et al. | 455/522 |
| 2010/0075663 A1* | 3/2010 | Chang et al. | 455/424 |
| 2010/0113028 A1* | 5/2010 | Simonsson et al. | 455/437 |
| 2010/0189050 A1* | 7/2010 | Beems Hart et al. | 370/329 |
| 2010/0220645 A1* | 9/2010 | Kwon et al. | 370/315 |
| 2010/0240388 A1* | 9/2010 | Nakatsugawa | 455/452.2 |
| 2010/0246469 A1* | 9/2010 | Gheorghiu et al. | 370/312 |
| 2010/0284364 A1* | 11/2010 | You et al. | 370/330 |
| 2010/0296475 A1* | 11/2010 | Visotsky et al. | 370/329 |

FOREIGN PATENT DOCUMENTS

| | | | |
|---|---|---|---|
| EP | 1773091 A2 * | 4/2007 | |
| WO | WO 2006/085801 A1 | 8/2006 | |
| WO | WO 2007/088465 A2 | 8/2007 | |
| WO | WO 2009084760 A1 * | 7/2009 | |

OTHER PUBLICATIONS

IEEE 802.16 Broadband Wireless Access Working Group, Interference Detection and measurement in OFDMA Relay Networks, Mar. 5, 2007, XP002526746.

IST-4-027756 Winner II D3.5.2 v1..0, Assessment of relay bases deployment concepts detailed description of multi-hop capable RAN protocols as input for the concept group work Jun. 30, 2007, XP-002526747.

Draft Standard for Local and Metropolitan Area Networks Part 16: Air Interface for Fixed and Mobile Broadband Wireless Access Systems Multihop Relay Specification Aug. 8, 2007 IEEE P802.16j/D1.

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Computer Society and the IEEE Microwave Theory and Techniques Society Sponsored by the LAN/MAN Standards Committee IEEE Std 802.16e™-2005 and IEEE Std 802.16™-2004/Cor1-2005 (Amendment and Corrigendum to IEEE Std 802.16/2004).

* cited by examiner

METHOD, APPARATUS AND COMPUTER PROGRAM FOR SIGNALING CHANNEL QUALITY INFORMATION IN A NETWORK THAT EMPLOYS RELAY NODES

TECHNICAL FIELD

The exemplary and non-limiting embodiments of this invention relate generally to wireless communications systems and, more specifically, relate to the communication of channel quality information for channels in a network that uses relay nodes, and further how that information may be used for scheduling decisions.

BACKGROUND

The following abbreviations are used in the description below:
  3GPP third generation partnership project
  CQI channel quality information
  DL downlink
  e-NodeB Node B of an E-UTRAN system
  eNBr relay-enhanced eNB
  E-UTRAN evolved UTRAN
  LTE long term evolution of 3GPP UTRAN (E-UTRAN or 3.9G)
  Node B base station or similar network access node, including e-NodeB
  RAN radio access network
  RBR radio band resource
  RN relay node
  RS relay station
  QoS Quality of Service
  UE user equipment (e.g., mobile equipment/station)
  UL uplink
  UMTS universal mobile telecommunications system
  UTRAN UMTS terrestrial radio access network 3GPP is standardizing the long-term evolution (LTE) of the UMTS radio-access technology which aims to achieve reduced latency, higher user data rates, improved system capacity and coverage, and reduced cost for the operator. Future LTEs standard releases (here termed Release 9 for brevity) may use relay nodes (RNs), alternatively termed relay stations (RSs), in order to enhance coverage areas in the cell of an e-NodeB. FIG. 1 gives an overview of how such RNs can be used to advantage: to extend wireless coverage to the interior of a building, to extend coverage beyond the cell edge (cell edge as defined by the radio range from the e-NodeB), to direct radio signals more particularly to a valley between buildings or to a radio-frequency 'shadow' behind a building, to extend the cell to other non-contiguous areas such as via multi-hops/multi-relays, and to provide robust radio signals in any other 'coverage holes' that may be at different areas of the cell. The RNs can be fixed or mobile, such as mounted to a high-speed train. In some systems the relay stations may be opportunistically available UEs/mobile terminals that are not owned by the network itself. For clarity, a network access node that employs RNs is termed a relay enhanced access node, or in the context of LTE it is termed an e-NBr for brevity.

Apart from this main goal of coverage extension, introducing relay concepts in LTE can also be used to aid in the provisioning of high-bit-rate coverage in high shadowing environment, to reduce the average radio-transmission power at the UE which extends the UE's battery life, to enhance cell capacity and effective throughput (e.g., by increasing cell-edge capacity and balancing cell load), and to enhance overall performance and deployment cost of the radio access network RAN.

After being carefully considered in pre-standardization activities like the Wireless World Initiative WWI/Wireless World Initiative New Radio WINNER system concept, relay systems are achieving the level of maturity that is needed in ongoing LTE standardization activities. The WINNER concept seeks to develop a system that is QoS aware and uses intelligent scheduling to meet user demands and physical constraints, in a model that is scalable for deployment to any of various spectrum types and bandwidths including spectrum sharing. This scalable deployment gives rise to relay nodes being an important part of the WINNER concept. As an example of later stages of relay node development, the IEEE 802.16j standardization adds relays to the IEEE 802.16e standard. This recent development has increased the pressure to consider relays also in LTE standardization. Certain wireless network operators have been actively pushing for relay standardization since it is expected that relay systems will be economically viable due to reduced backhaul and site acquisition costs. In order to keep LTE competitive it is more than probable that relay extensions to LTE are to be studied within 3GPP in the release 9. Various topics will be studied and relays appear likely to play an important role in LTE Release 9, and RSs are likely to be included in the LTE Release 9 agenda.

There are many specific types of relay systems proposed, from the simple (e.g., amplify/forward implementations, applied in single frequency networks such as digital video broadcast for handhelds DVB-H, for example) to the more complex such as using network coding to improve the overall performance. A common relay type that is proposed for cellular relaying is a detect/forward type of relay, where an input signal is detected and retransmitted using the same procedure as in the original transmission. The following discussion assumes the detect/forward type implementation for a relay network.

To ensure economic viability in adopting RNs into the LTE network, backward compatibility between Release 8 (standardization ongoing) and Release 9 will be needed. A reasonable assumption is that full backward compatibility is required from the UE perspective, i.e. Release 8 and Release 9 terminals should work equally well in Release 8 and in Release 9 networks. At the network side software and even hardware updates between standard releases may be possible but preferably they should be as small as possible. Hence, from the UE viewpoint the serving network node should function in exactly the same way as the e-NodeBs of Release 8. Due to this requirement, the reduction of functionalities of the e-NodeB when defining and implementing relay nodes will be difficult, and the relay nodes will need to support all of the main e-NodeB functions also. Due to this fact it can be assumed that relay nodes are capable of flexible resource sharing with the e-NodeB that controls them.

Assuming no RNs in an LTE (also known as E-UTRAN or 3.9G) cell so that the UEs and the e-NodeB communicate directly, the link adaptation and scheduling procedures utilize channel quality information (CQI) reports from the active UEs. An ideal CQI report tells the e-NodeB the quality of each radio band resource (RBR) that the corresponding UE being served measures. The e-NodeB can utilize this information for optimal scheduling and link adaptation. However, ideal CQI reporting on an RBR basis is not practical due to the limited number of pilot symbols available and also to the need to control the volume of control signaling overhead. The prior art does address several low bandwidth CQI schemes, the most representative ones seen to be offset CQI, threshold CQI and best-M CQI reporting.

The introduction of RNs can have an impact on the overall architecture of the network as well as the CQI reporting and its usage for scheduling and link adaptation. The scheduling of UEs under control of a RN can be done by the RN with the help of the controlling e-NodeB (e.g., where the RN is given some authority to schedule radio resources given by the e-NodeB), or solely by the controlling eNBr (where the RN acts as a communication conduit and all scheduling decisions are by the e-NodeB).

Certain problems arise in the former case. The RN may be doing the scheduling, but the impact of erratic radio channels has to be taken into account so that the controlling eNBr is able to assign sufficient radio resources for the RN to operate and provide adequate quality of service (QoS) to each relayed UE. For instance, a situation may arise when a certain relayed UE's buffer in the RN is being overfilled because the RN-UE link for that UE is very bad (low CQI) and it is not being scheduled by the RN, while at the same time the e-NodeB keeps sending data for that UE in the eNBr-RN link, which has a sufficiently good link i.e. high CQI. This is a flow control problem with no analogy to the case where the link is direct between the UE and the e-NodeB and there are no RNs between them.

The introduction of RNs is a new concept in LTE. Thus, scheduling and associated CQI reporting has not been considered previously. The case where RNs control the scheduling of its own users is similar to the non-transparent mode defined in WIMAX. However, the issues regarding CQI reporting and scheduling are not resolved since those are different in LTE.

What is needed in the art is an approach to optimize scheduling of UEs under control of a RN for various actual channel conditions that exist between the RN and the UEs under its control, preferably in a manner that is consistent with LTE.

SUMMARY

In accordance with one aspect of the invention is a method that includes receiving from a plurality of user equipments indications of channel quality experienced by the user equipments, then aggregating the received indications into a compound signal quality metric. Thereafter, the method continues with sending an indication of the compound signal quality metric to an access node controlling a cell in which the user equipments operate. In a particular embodiment, the format and signaling procedure to indicate this metric information can be layer 1 L1 or higher (e.g., L2 Medium Access Control MAC layer or L3 Radio Resource Control RRC layer).

In accordance with another aspect of the invention is an apparatus that includes a receiver, a processor and a transmitter. The receiver is configured to receive from a plurality of user equipments indications of channel quality experienced by the user equipments. The processor is configured to aggregate the received indications into a compound signal quality metric. The transmitter is configured to send an indication of the compound signal quality metric to an access node controlling a cell in which the user equipments operate.

In accordance with another aspect of the invention is a computer readable memory embodying a program of machine-readable instructions executable by a digital data processor to perform actions directed toward sending quality indications. In this embodiment the actions include, responsive to receiving from a plurality of user equipments indications of channel quality experienced by the user equipments, and aggregating the received indications into a compound signal quality metric. Further, the actions include sending an indication of the compound signal quality metric to an access node controlling a cell in which the user equipments operate.

In accordance with another aspect of the invention is an apparatus that includes receiving means for receiving from a plurality of user equipments indications of channel quality experienced by the user equipments, processing means for aggregating the received indications into a compound signal quality metric, and transmit means for sending an indication of the compound signal quality metric to an access node that controls a cell in which the user equipments operate. In a particular embodiment the receiving means is a wireless receiver, the processing means is a digital data processor, and the transmit means is a wireless transmitter, and the apparatus is a relay node in a LTE network cell.

In accordance with another aspect of the invention is a method that includes allocating in a first instance radio resources to a relay node for use by user equipments under control of the relay node, receiving from the relay node a compound signal quality metric that aggregates channel quality on links between the user equipments and the relay node, deciding a new allocation of radio resources based at least in part on the compound channel quality metric, and allocating in a second instance the new allocation of radio resources to the relay node. In a particular embodiment there is also received an indication of buffer occupancy of the relay node, and the new allocation is decided so as to manage flow control from the user equipments as a function of the compound signal quality metric and the received buffer occupancy.

In accordance with another aspect of the invention is an apparatus that includes a transmitter, a processor and a receiver. The transmitter is configured to send to a relay node in a first instance radio resources for use by user equipments under control of the relay node. The receiver is configured to receive from the relay node a compound signal quality metric that aggregates channel quality experienced on links between the user equipments and the relay node. The processor is configured to decide a new allocation of radio resources based at least in part on the received compound channel quality metric. And the transmitter is further to send to the relay node in a second instance the new allocation of radio resources.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

These teachings focus primarily on the case where the RNs take the main responsibility for scheduling their users. In this case, it may not be needed for the e-NodeB to be aware of the CQI between RN and individual relayed UEs, though for reasons noted above it is important from a flow control perspective that the e-NodeB not be wholly unaware of the quality of the UE-RN link. Embodiments of this invention provide a solution to such a flow control problem. While specific examples are presented in the particular context of LTE, the invention is not limited only to LTE but may be employed in any wireless access network that employs relay nodes under control of a controlling access node.

Figure 1:
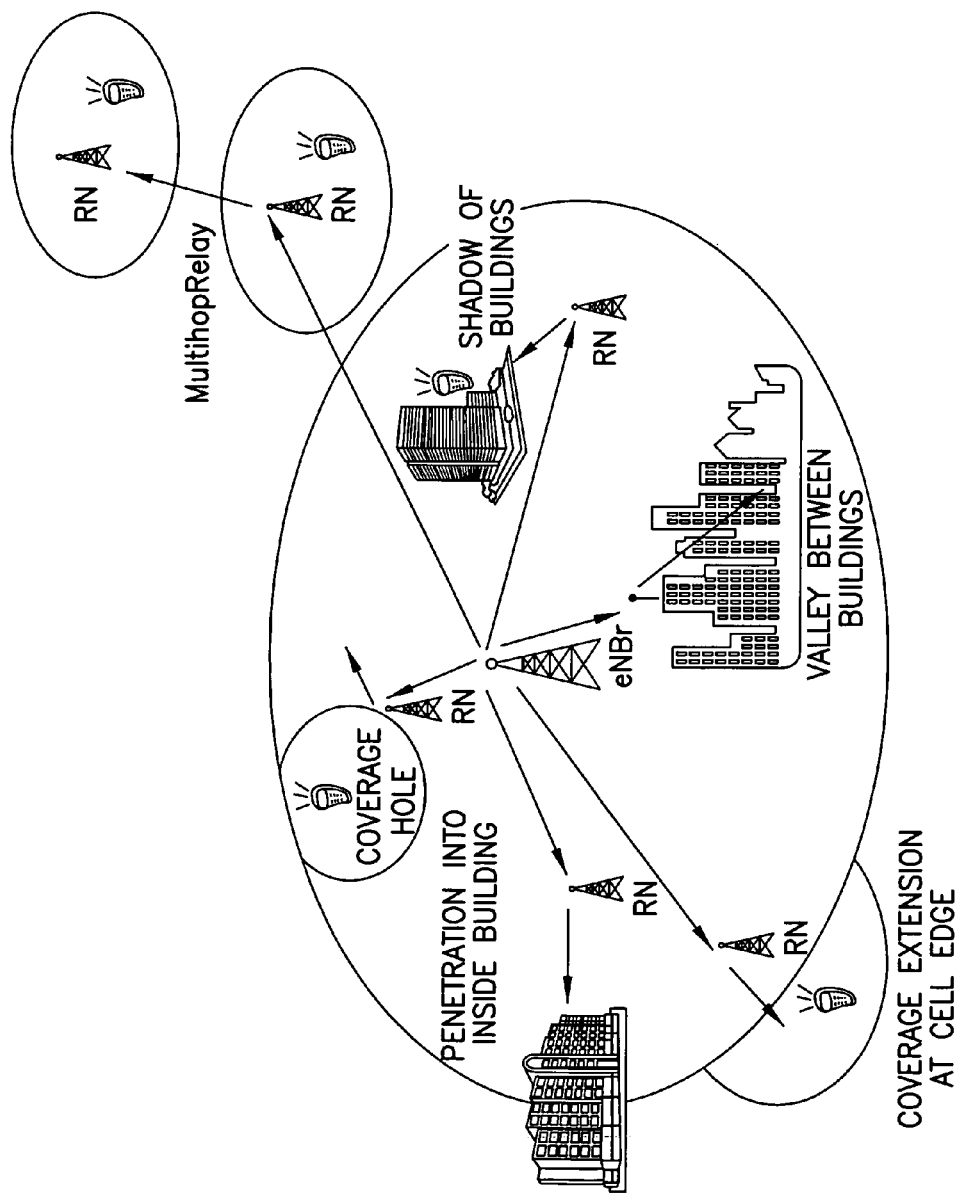
FIG. 1 is a schematic diagram showing a relay network with a controlling access node and various relay nodes serving to enhance coverage for mobile terminals in various scenarios, a context which is relevant to these teachings.

For the description below it is assumed that at maximum two hops are allowed per communication (between UE and e-NodeB or between UE and RN and e-NodeB), and the relay nodes are arranged in a tree topology (no connections between relay nodes). Note that this second assumption excludes two instances shown in FIG. 1. The invention is not limited by either of these two assumptions, but they are noted as constraining the specific examples given rather than the breadth of these teachings. Embodiments of the invention can be used with other network topologies, and/or across more than two-hop links.

Embodiments of this invention relate to integrating information at the RN, and sending that integrated information to the e-NodeB which can then be used for UE scheduling and for controlling the flow of DL data to the UEs in a relay enhanced LTE network. The integrated information is a quality metric indicative of the link between the RN and the UEs under its control, but the quality metric is compound rather than reflective of an individual link. The compound metric may be, for example, averaged over multiple UEs or over multiple RBRs in order to reduce signaling overhead on the link between the RN and the eNBr, as compared to forwarding all the CQI values that the UEs report to the RN. This compound information can still be used to enhance data transmission on the link going between the eNB and the RN to avoid buffer over/under run as noted above, and also for the eNBr to assign suitable resources for the links between the RN and the UEs.

Figure 2:
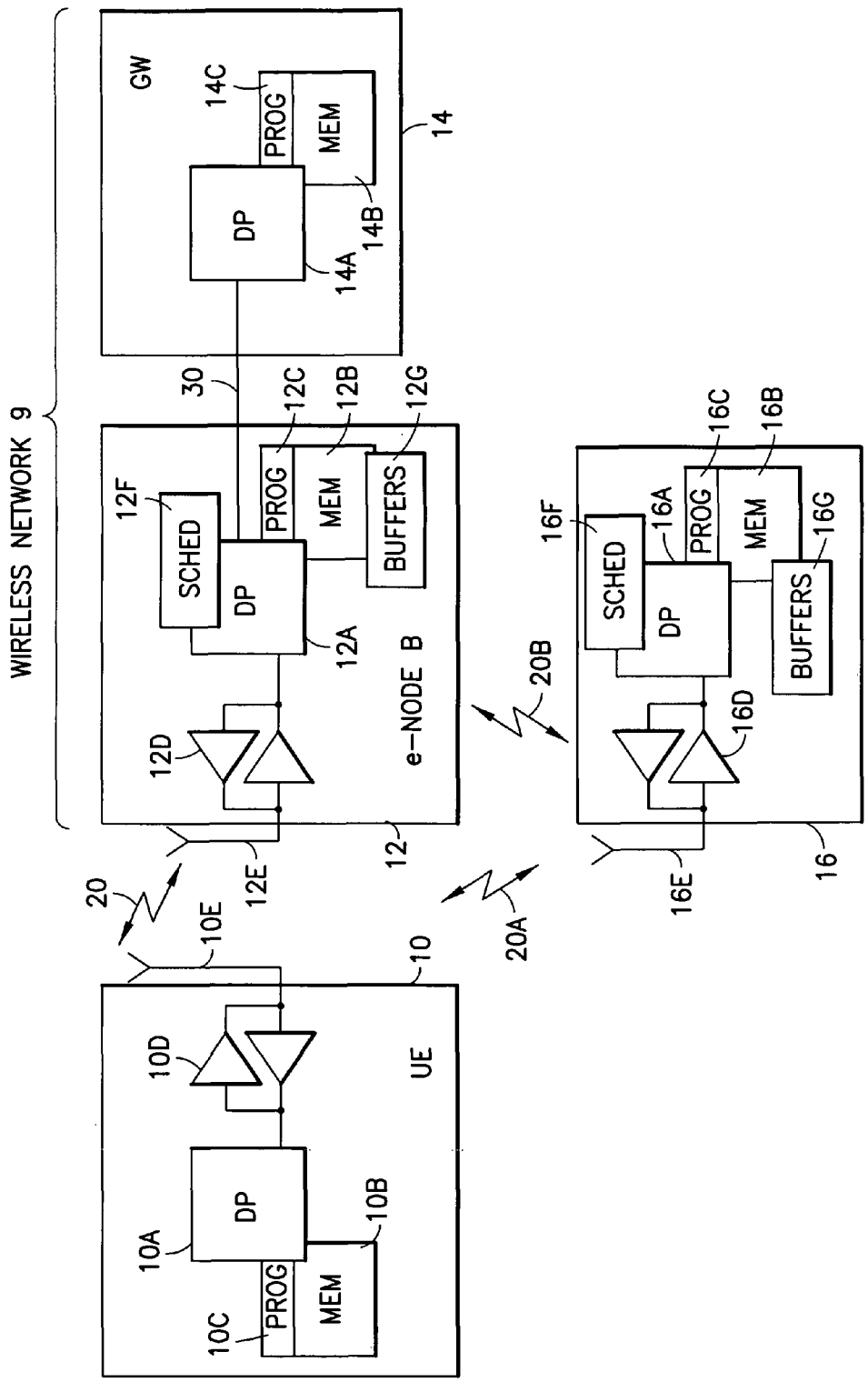
FIG. 2 shows a simplified block diagram of various electronic devices that are suitable for use in practicing the exemplary embodiments of this invention.

As a preliminary matter before exploring details of various implementations, reference is made to FIG. 2 for illustrating a simplified block diagram of various electronic devices that are suitable for use in practicing the exemplary embodiments of this invention. In FIG. 2 a wireless network 9 is adapted for communication between a UE 10 and a Node B 12 (e.g., a wireless access node, such as a base station or particularly an eNBr for a LTE system). The network 9 may include a gateway GW/serving mobility entity MME/radio network controller RNC 14 or other radio controller function known by various terms in different wireless communication systems. The UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the eNBr 12.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The eNBr 12 also includes a DP 12A, a MEM 12B, that stores a PROG 12C, and a suitable RF transceiver 12D coupled to one or more antennas 12E. The eNBr 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 30. Also shown as part of the MEM 12B is a plurality of buffers 12G for storing data and information to be sent over one of the wireless links 20, 20B. These buffers 12G are detailed more particularly below.

Also within the eNBr 12 is a scheduler 12F that schedules the various UEs under its control for the various UL and DL radio resources (RBRs and transmission time resources). Once scheduled, the e-NodeB sends messages to the UEs with the scheduling grants (typically multiplexing grants for multiple UEs in one message). These grants are sent over particular channels such as the Physical Downlink Control Channel (PDCCH) in LTE. Generally, an e-NodeB of an LTE system is fairly autonomous in its scheduling and need not coordinate with the GW/MME 14 excepting during handover of one of its UEs to another Node B/e-NodeB or for the purpose of other higher layer reconfiguration signaling.

The network also employs a RN 16, shown also as having a DP 16A and a MEM 16B that stores a PROG 16C, and using a transceiver (transmitter and receiver) 16D for communications via at least one antenna 16E over a first link 20A with the UE 10 (as well as other UEs under the RN's control) and over a second link 20B with the eNBr 12 that is controlling the cell. In the embodiments detailed below, the direct link 20 between the eNBr 12 and the UE 10 is not in active use but instead communications are routed through the RN 16 via the first and second links 20A, 20B. The RN 16 may also have a scheduler 16F for allocating radio resources (RBRs) to the UEs under its control, for the case considered here where the eNBr 12 grants the RN 16 a block of radio resources for use in its area of the cell for allocating to those UEs under the RN's control.

At least one of the PROGs 10C, 12C and 16C is assumed to include program instructions that, when executed by the associated DP, enable the electronic device to operate in accordance with the exemplary embodiments of this invention, as detailed above. Inherent in the DPs 10A, 12A, and 16A is a clock to enable synchronism among the various apparatus for transmissions and receptions within the appropriate time intervals and subframes required, as the scheduling grants and the granted resources/subframes are time dependent. The transceivers 10D, 12D, 16D include both transmitter and receiver, and inherent in each is a modulator/demodulator commonly known as a modem. The DPs 12A, 14A and 16A also are assumed to each include a modem to facilitate communication over the (hardwire) link 30 between the eNBr 12 and the GW 14 and over the various wireless links 20, 20A, 20B shown between the particular electronic apparatuses.

The PROGs 10C, 12C, 16C may be embodied in software, firmware and/or hardware, as is appropriate. In general, the exemplary embodiments of this invention may be implemented by computer software stored in the MEM 16B and executable by the DP 16A of the RN 16 and similar for the other MEM 12B and DP 12A of the eNBr 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Embodiments of the RN may be a UE or may be a fixed or mobile access node under control of the controlling eNBr that is controlling in the cell.

The MEMs 10B, 12B and 16B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 16A may be of any type suitable to the local technical environment, and may include one or more of general purpose computers, special purpose computers, microprocessors, digital signal processors (DSPs) and processors based on a multi-core processor architecture, as non-limiting examples.

Now are described the particular embodiments of the invention in detail. The end result is that scheduling and controlling the flow of DL data is integrated in a relay enhanced network such as an LTE network. According to an embodiment, a plurality of UEs under control of a relay node send to the RN the CQI measurements for RBRs allocated to the system/cell (not only those RBRs in use and assigned to the respective UEs). The RN receives these messages, and aggregates information from those messages into a compound signal quality metric. The RN then sends the compound signal quality metric to the eNBr. The aggregating may be over multiple UEs, or it may be for multiple RBRs allocated to the same UE, or it may be over some combination of a plurality of RBRs and UEs including all UEs and all RBRs. The latter may be practical where the RN has control over only a fairly limited geographic area and/or very limited radio resources. The compounding is in one embodiment averaging signal quality of the received CQI measurements.

It is clear then that the compounded signal quality metric can be signaled with fewer bits than the individual RBR CQI values that are reported by the UEs 10 to the RN 16, and so embodiments of the invention reduce signaling overhead on the link 20B between the RN 16 and the eNBr 14. This compound information can still be used to enhance data transmission on the link 20B between the eNBr 12 and the RN 16 to avoid buffer over/under run and also for the eNBr 12 to assign suitable resources for the links 20A between the RN and the UE.

The RN 16 has the CQI information available for all of its users/UEs 10 and it can summarize this CQI information and send it to the eNBr 12 in one of at least two ways as noted above, denoted here as the compound signal quality metrics:

CQI_AVG_RBR: The CQI for each RBR is averaged over all the UEs.

CQI_AVG_UE: The CQI for each UE is averaged over all the RBRs.

Figure 3:
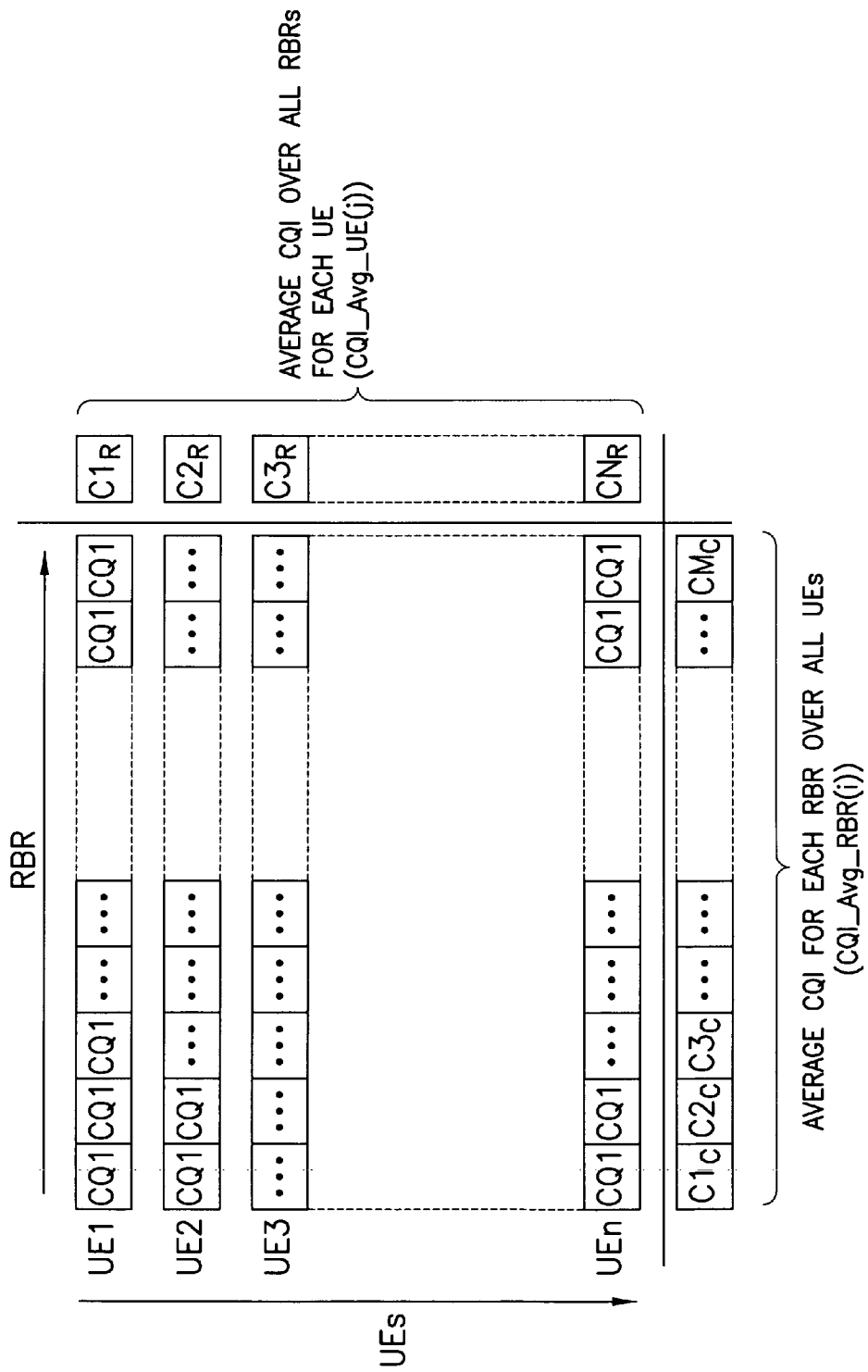
FIG. 3 illustrates channel quality indicators reported by various UEs under control of a relay node for various radio band resources, arranged in a table, and resulting averages calculated by the relay node for reporting to the access node/e-NodeB according to certain embodiments of the invention.

This is shown diagrammatically at FIG. 3, which is a tabular form of the CQI information arranged by UEs ($UE_1$, $UE_2$, ... $UE_N$) along rows and arranged by RBRs along columns. Within the table, each of the entries CQI is the CQI value reported by the UE 10 of that row for the RBR for that column. RBR is a frequency band corresponding to one or more physical resource blocks as defined in the LTE standard. The lowermost row below the table of CQI values (with entries $C1_C$, $C2_C$, $C3_C$ ... $CM_C$) represent the RBR averaged quality, the CQI-AVG-RBR for the $i^{th}$ RBR column, where there are M RBRs and i is an integer index of the RBRs from 1 thorough M. Similarly, the rightmost column of FIG. 3 outside the table of CQI values (with entries $C1_R$, $C2_R$, $C3_R$, ... $CN_R$) represent the UE averaged quality, the CQI-AVG-UE for the $j^{th}$ UE column, where there are N UEs and j is an integer index of the UEs 10 under control of the RN 16 from 1 thorough N. Note that compressed CQI reporting schemes proposed for LTE Release 8 (e.g., threshold based, Best-M, etc.) can still be used along with the aggregating mechanisms proposed here. Such compression schemes are known in the art and not detailed here further. When the values reported by the UEs are the compressed CQI values, it is straightforward for the RN 16 to average over the reported Best-m (or other compression) CQIs which are likely to be used for scheduling to achieve the above CQI-AVG-RBR and/or CQI-AVG-CQI.

The CQI_AVG_RBR metric gives an average indication on which RBRs are the most suitable for the transmission between the RN 16 and the served users/UEs 10. As such, the eNBr 12 can use this information to decide which RBRs can be allocated to RN 16 for the next scheduling period on the RN-UE link 20A. The RN 16 can pass the CQI_AVG_RBR information explicitly (we name this case CQI_Averaged) or it can pass it implicitly by using it as a weighting factor when it reports the CQI of the eNBr-RN link 20B (CQI_Weighted). In the latter, the weighting is done by mapping the CQI_AVG_RBR into a gain factor. That is, if UEs 10 being served by the RN 16 are experiencing bad channel condition on the average, the CQI of the eNBr-RN link 20B will be reduced by the gain factor while when they are experiencing very good channel conditions, it will be increased by the gain factor. Note that in an embodiment CQI_Weighted and CQI_Averaged can be used together, where the RN reports both to the RN but at different reporting rates.

Note that the actual scheduling and allocation of the RBRs can still be done by the RN 16 individually for each UE 10, but with the help of CQI_AVG_RBR the eNBr 12 can better decide which pool/group of RBRs to assign to the RN 16 for the RN-UE links 20A and which other RBRs to use (e.g. for direct transmission) from the eNBr 12 to other, directly served UEs. Furthermore, if there are RNs 16 in close vicinity to each other, it may be beneficial to allocate at least partly non-overlapping RBR pools to both RNs 16 in order to avoid or reduce interference between the two. This is particularly advantageous, if the RNs 16 serve overlapping areas, this may well happen if RN locations are not strictly planned, or if one or more of the RNs are mobile (e.g., on a high-speed train). The described CQI_AVG_RBR then allows the eNBr 12 to assign the RBRs optimally to the RNs 16 (i.e. each gets the RBRs that will give optimum performance for the assigned UEs 10).

On the other hand, CQI_AVG_UE tells which UEs 10 are experiencing the best radio conditions in the access links on the average. Using this information, the eNBr 12 decides which UEs' data and how much data for each UE to send on the eNBr-RN link 20B and this will help in mitigating the flow control problem described in the background section above. This is because the eNBr 12 is giving priority to the UEs 10 experiencing good radio conditions and as such both over-buffering and buffer under-run in the RN 16 is prevented.

In an embodiment, both the CQI-AVG-UE and the CQI-AVG-RBR are used, but are sent at different times. The RN 16 forwards both reports periodically, but not necessarily with the same period. The actual reporting periods are parameters to be determined through optimization procedures that depend on the operating network. The flow control information (i.e. CQI_AVG_UE) can also be reported on an event-based fashion (for example, when the averaged CQIs of the UEs 10 are showing too much difference, as reporting when they are very similar will not provide any useful information for the eNBr 12.)

The deployment of RNs 16 reduces the dynamic of CQI range for relayed users and therefore a simple averaging may be sufficient for the CQI_AVG_UE to meet the needs of the eNBr 12. However, since the UE 10 is going to be scheduled in the RBRs that are experiencing good quality, the CQI_AVG_UE calculation can take this into consideration by weighting the RBRs that are experiencing good conditions more than the ones that are experiencing bad conditions. In this way a better estimation of the experienced channel quality in the RBRs where the UE 10 is actually scheduled can be achieved.

It is possible to perform flow control based on the CQI_AVG_UE reports as described above, but flow control can be performed more explicitly via buffer status reporting. Within the RN 16 there is a buffer 16G for each of the UEs 10 under its control. It is the status of these buffers 16G to which the following refers. For this explicit buffer status reporting, the RN 16 reports to the eNBr 12 the buffer status of its UEs 10 in one of at least two fashions, or their combination, termed herein Periodic and Early Detection.

For periodic reporting, a semi dynamic variable, RN_buffer_status_reporting_period, is used. The RN 16 reports periodically every RN_buffer_status_reporting_period its buffer status corresponding to each of the UEs that it is serving. The eNBr 12 will inform the RN 16 of the reporting period according to a particular embodiment.

For early detection reporting, two semi dynamic variables are used, RN_buffer_overload_limit and RN_buffer_underload_limit. In an embodiment these are each percentage values, and are used as threshold by which to generate a report to the eNBr 12. When the buffer of a certain UE 10 at the RN 16 becomes higher than the RN_buffer_overload_limit or when it becomes lower than RN_buffer_underload_limit, the RN reports a buffer status report to the eNBr 12 with the information regarding this. Note that the RN_buffer_underload_limit is effective only once after the RN_buffer_overload_limit has been reported. These reports can be done instantaneously, i.e. when the limits are reached, or optionally, a variable RN_buffer_overload_underload_reporting_period, can be used where the RN 16 reports periodically the buffers of all of the UEs that have passed these limits.

The eNBr 12 will then be able to use these reports during scheduling. If periodic reporting is used, the operation is similar to the CQI_AVG_UE based flow control, i.e. UEs with the largest buffer occupancy in the RN 16 can be either given lower priority, or not even scheduled at all for a given period. On the other hand, with early detection, the eNBr 12 could give low priority to the UEs 10, or even pause the scheduling when they report RN_buffer_overload_limit and raise their priority (or resume their scheduling in case the decision was to pause their scheduling) when they report RN_buffer_underload_limit.

The various techniques detailed above can be used in combination. For example, the network 9 can use a combination of the buffer based and the CQI_AVG_UE based flow control for an efficient and robust operation. For example, the network 9 can use the RN early-detection buffer-status reporting of individual UEs combined with the averaged CQI reporting for flow control and resource re-assignment between the controlling eNBr 12 and its RN 16.

Furthermore, the CQI_AVG_UE can be used to make a prediction when the buffer may under-run or over-run. The RN 16 can then report at a predetermined time before the buffer under-run instead of reporting at a fixed buffer size RN_buffer_underload_limit. The advantage of this approach is that then the eNBr 12 always has the same time to react until the buffer actually gets empty (or overfull), while using a fixed value of RN_buffer_underload_limit would mean that UEs 10 which experience a good channel condition will deplete the buffer quickly while the UEs 10 with a poor channel will take much longer to deplete the same amount of data. Therefore, taking the CQI_AVG_UE into account can help to better select for which UEs 10 to forward data to the RN 16, namely for those UEs 10 whose buffer threatens to be depleted at the earliest. Using the achieved data rates in the past can also be used for this purpose, but CQI gives a better estimate for the future data rates which are more relevant to anticipating buffer over-run and under-run.

Note that the combination of CQI_AVG_UE and RN_buffer_underload_limit can be done in the RN 16, then the compound information taking both into account can be signaled to the eNBr 12. Alternatively, both values could be signaled individually to the eNBr 12 and the eNBr 12 takes them both into account. The former approach saves some signaling overhead on the second link 20B while the latter approach gives more complete information to the eNBr 12.

In the exemplary embodiment described above, the buffer status and the compound CQI information was combined into a prediction of the time when the buffer would under run or over run. Note however, that various variants of this approach are possible by combining buffer status and CQI in another way and still convey some information about the buffer status, even if it is not exactly the time expected for buffer depletion. For example, some maximum or minimum data rates can be considered during calculation rather than fully obeying the compound CQI information. Also further information and parameters can be taken into account, e.g. the priority of a user or a service, because high priority data/users may be scheduled with higher priority and therefore the associated buffers are likely to under run more early.

Further more, it is not only possible to aggregate CQI values and buffer status for individual users, but also for user classes e.g. users sharing the same or similar priority class. This is motivated by the following arguing: the RN will have to take care that data are scheduled in a fair way for users within a certain priority class, but the scheduling priority and consequently the achievable data rates may vary greatly for users of different priority classes. Therefore it may be sufficient to report only for a single user of a priority class of report a value that is aggregated i.e. compound e.g. averaged for several or all users of a specific priority class. In this way the signaling overhead can be further reduced, without substantial loss of useful knowledge at the eNodeB.

For the case where ideal CQI forwarding is used (all CQI values reported from the UEs are forwarded through the RN to the eNBr), the RN 16 will need to send m×n (considering m RBRs are reported per UE, and there are n UEs) information elements. With the CQI_Weighted implementation, this is reduced to zero because the RN 16 doesn't send any extra information explicitly. Even without using CQI_Weighted, the amount of information elements to be sent to the eNBr 16 is reduced to m for the case where CQI_AVG_UE is used, or to n for the case where CQI_AVG_RBR is used, or to m+n for the case where both are used. In all cases this is less signaling overhead than relaying the m×n CQI information elements reported by the UEs 10.

It is noted that CQI_Weighted reporting may be appropriate even though the channel qualities of the relay link 20B and the access links 20A can be quite different, e.g. because the relay node is typically fixed and therefore the channel quality for the eNBr-RN link 20B is more or less stable or slowly time-varying varying only. Note however, that also the inverse may happen e.g. for relays mounted on trains or other vehicles, there the channel quality for the eNBr-RN link 20B can vary quickly while the channel between relay and terminal is rather stable, because a voyager typically doesn't move quickly within the vehicle. Therefore the reporting rates on the two links may be substantially different. Also the times above which the data are accumulated or averaged may vary as well. If the channel quality of the link between terminal and RN is changing so quickly that reports cannot be done in time to the eNodeB, then it may be better not to report instantaneous values but rather averaged values over some time and also averaged over possible RBRs. It is possible to get more reliable information by averaging over the quality of individual RBRs in time and frequency.

The flow control mechanisms described here generally do not require any implementation change at the UEs. Also, the CQI-based scheduling that is based on the weighted CQI does not require any changes at the eNBr 12 as compared with a relay enhanced system with no relay link CQI-based scheduling, because the eNBr 12 in that case treats the weighted CQI as the CQI of the backhaul link (the DL between the RN 16 and the UE 10). The various compressed CQI reporting schemes proposed for LTE Release 8 (threshold based, Best-M, etc.) can still be used for the RN-UE link, thus further reducing the signalling on the both RN-eNB and UE-RN links.

Both flow control mechanisms described avoid the need for forwarding the CQI of each relayed user to the eNBr 12 via the RN 16, and hence greatly reduce the CQI-related signaling overhead. The buffer based flow control is seen to be more accurate in tracking indirectly the CQI of the access links 20A as compared with the CQI_AVG_UE based flow control, but it requires somewhat more control signaling.

Scheduling based on the weighted CQI reporting does not have any overhead, because one CQI report is still sent, but if the RN 16 is serving a very small number of users, the averaging and weighting might result in suboptimal scheduling as one UE 10 that is in a very bad condition can drag the performance of another one experiencing excellent channel conditions. Thus, the weighted CQI option becomes more attractive when the number of users served by the RN 16 is considerable. A more advanced flow control algorithm can be employed that takes into account this fact by switching from CQI_averaged to CQI_weighted (and vice versa) scheduling depending on the number of relayed users, such as using a ratio of variance between best and worst CQI and number of UEs for determining whether to use one flow control metric or the other.

If there are more than one RNs 16 in a cell and if each is serving a considerable number of UEs, the weighted CQI can enable faster scheduling as the users can be grouped easily into sets of priority groups depending on the weighted CQI of the backhaul link.

Figure 4:
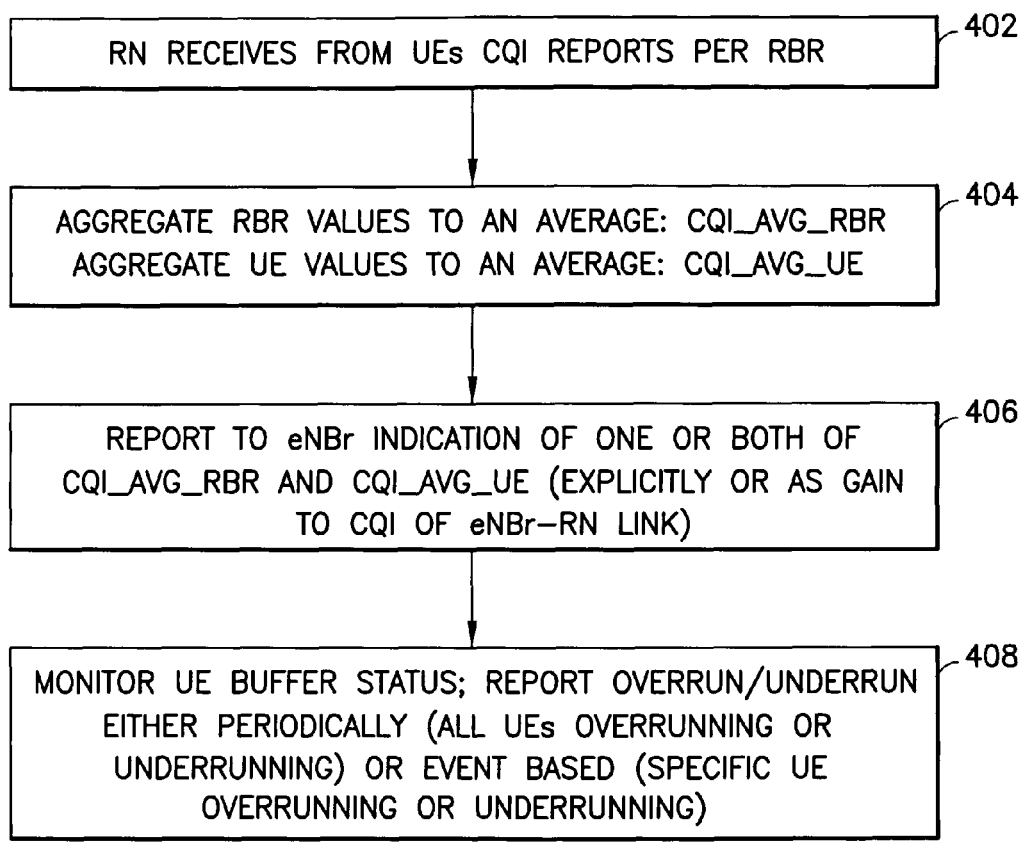
FIG. 4 is a process flow diagram illustrating process steps according to a particular embodiment of the invention.

Some of the major points detailed above are summarized at FIG. 4. At block 402 the RN 16 receives from the UEs 10 under its control the CQI reports, which give a CQI value per RBR. These CQI reports can be based on any of the compressed CQI reporting schemes proposed for LTE Release 8 (threshold based, Best-M, etc.). At block 404 both averages are calculated, one from the aggregated RBR values across all of the UEs reporting for that RBR, and the other averaged per UE across all RBRs reported by the respective UE 10. As above, different implementations use either or both of these averages. At block 406 the RN 16 reports an indication of the average to the eNBr 12, which may be an explicit average sent in the message or it may be implicit such as a gain applied to the CQI of the link 20B between the RN 16 and the eNBr 12 that the RN reports to the eNBr 12. At block 408 the buffer status for each of the UE-specific buffers in the RN 16 is monitored. For periodic reports, overruns and underruns are reported periodically for each UE buffer experiencing the overrun/underrun (compare buffer state to the thresholds, or predict it based on actual or anticipated rate). For event-based reports, the overrun/underrun determination will cause the RN 16 to send the report at block 408.

For the aspects of this invention related to network, embodiments of this invention may be implemented by computer software executable by a data processor of the RN 16, such as the processor 16A shown, or by hardware, or by a combination of software and hardware. For the aspects of this invention related to eNBr 12, embodiments of this invention may be implemented by computer software executable by a data processor of the eNBr 12, such as the processor 12A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention. For example, the channel quality experiences on the links between the user equipments described above in detail assume that communications are done only on the radio resources allocated by the relay node, but it may obtain estimates on other resources also. For example, the relay node could send dedicated pilots on a fraction of these resources and the user equipments could use these pilots for estimations. There are already ways known in the art to distinguish pilot transmissions from different eNBs (or relay nodes) such as by using different pilots. This technique is sometimes used on different sectors of the same site that have some overlap.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
    receiving at an apparatus which comprises a relay node a grant from an access node of radio band resources that are available for allocation to the user equipments; and
    allocating by the relay node to the user equipments at least some of the radio band resources;
    receiving, by the apparatus from a plurality of user equipments, indications of channel quality experienced by the user equipments, wherein the indications are received at the relay node and are specific for a radio band resource allocated to the respective user equipment;
    aggregating by the apparatus the indications received from the plurality of user equipments into a compound signal quality metric;
    monitoring, by the apparatus, a buffer status of an apparatus buffer which comprises individual buffers for each of the plurality of user equipments; and
    sending by the apparatus a combination of an indication of the compound signal quality metric and a further indication of the buffer status to an access node controlling a cell in which the user equipments operate,
    wherein the further indication of the buffer status comprises a buffer overload or a buffer underload state determined individually for one or more of the plurality of user equipments by prediction based on the compound signal quality metric.

2. The method of claim 1 wherein received indications from each one of the plurality of user equipments are a plurality of channel quality indications for unique ones of a plurality of radio band resources.

3. The method of claim 2, wherein aggregating comprises averaging all of the channel quality indications that are received for the plurality of radio band resources from a single one of the user equipments, and the compound signal quality metric is specific to the single one of the user equipments.

4. The method of claim 2, wherein aggregating comprises averaging the channel quality indications that are received from multiple ones of the user equipments for a single one of the plurality of radio band resources.

5. The method of claim 1, wherein for a first instance aggregating comprises averaging all of the channel quality indications that are received by the apparatus from a single one of the user equipments; and for a second later instance aggregating comprises averaging all of the channel quality indications that are received by the apparatus from multiple ones of the user equipments for a single radio band resource, wherein sending comprises sending an indication of the respective compound signal quality metric by the apparatus to the access node at different times.

6. The method of claim 1, wherein the indication of the compound signal quality metric is the compound signal quality metric itself.

7. The method of claim 1, wherein the indication of the compound signal quality metric comprises a gain applied to a downlink channel quality parameter that is measured by the apparatus that receives the indications of channel quality experienced by the user equipments.

8. The method of claim 1, wherein the buffer underload or the buffer overload is a percentage value.

9. An apparatus comprising:
    a receiver configured to receive from a plurality of user equipments indications of channel quality experienced by the user equipments and configured to receive a grant from an access node of radio band resources that are available for allocation to the user equipments;
    a processor configured to allocate to the user equipments at least some of the radio band resources and to aggregate the indications received from the plurality of user equipments into a compound signal quality metric and to monitor a buffer status of an apparatus buffer which comprises individual buffers for each of the plurality of user equipments, wherein the received indications are specific for a radio band resource allocated to the respective user equipment; and
    a transmitter configured to send a combination of an indication of the compound signal quality metric and a further indication of the buffer status to an access node controlling a cell in which the user equipments operate,
    wherein the apparatus comprises a relay node, and
    the further indication of the buffer status comprises a buffer overload or a buffer underload state and the processor is further configured to determine the buffer overload or buffer underload individually for one or more of the plurality of user equipments by prediction based on the compound signal quality metric.

10. The apparatus of claim 9, wherein received indications from each one of the plurality of user equipments are a plurality of channel quality indications for unique ones of a plurality of radio band resources.

11. The apparatus of claim 10, wherein the processor is configured to aggregate by averaging all of the channel quality indications that are received for the plurality of radio band resources from a single one of the user equipments, and the compound signal quality metric is specific to the single one of the user equipments.

12. The apparatus of claim 10, wherein the processor is configured to aggregate by averaging the channel quality indications that are received from multiple ones of the user equipments for a single one of the plurality of radio band resources.

13. The apparatus of claim 9, wherein for a first instance the processor aggregates by averaging all of the channel quality indications that are received from a single one of the user equipments; and for a second later instance the processor aggregates by averaging all of the channel quality indications that are received from multiple ones of the user equipments for a single radio band resource, wherein the transmitter is configured to send an indication of the respective compound signal quality metric to the access node at different times.

14. The apparatus of claim 9, wherein the indication of the compound signal quality metric is the compound signal quality metric itself.

15. The apparatus of claim 9, wherein the indication of the compound signal quality metric comprises a gain applied to a downlink channel quality parameter that the apparatus measures.

16. The apparatus of claim 9, wherein the buffer underload or the buffer overload is a percentage value.

17. A computer readable memory embodying a program of machine-readable instructions executable by a digital data processor to perform actions directed toward sending quality indications, the actions comprising:
receiving at an apparatus which comprises a relay node a grant from the access node of radio band resources that are available for allocation to the user equipments; and
allocating by the apparatus to the user equipments at least some of the radio band resources;
receiving, by the apparatus from a plurality of user equipments, indications of channel quality experienced by the user equipments, wherein the indications are received at the relay node and are specific for a radio band resource allocated to the respective user equipment;
aggregating by the apparatus the indications received from the plurality of user equipments into a compound signal quality metric;
monitoring, by the apparatus, a buffer status of an apparatus buffer which comprises individual buffers for each of the plurality of user equipments; and
sending by the apparatus a combination of an indication of the compound signal quality metric and a further indication of the buffer status to an access node controlling a cell in which the user equipments operate,
wherein the further indication of the buffer status comprises a buffer overload or a buffer underload state determined individually for one or more of the plurality of user equipments by prediction based on the compound signal quality metric.

18. The computer readable memory of claim 17, wherein received indications from each one of the plurality of user equipments are a plurality of channel quality indications for unique ones of a plurality of radio band resources, and wherein aggregating comprises at least one of:
all of the channel quality indications that are received for the plurality of radio band resources from a single one of the user equipments, and the compound signal quality metric is specific to the single one of the user equipments; or
averaging the channel quality indications that are received from multiple ones of the user equipments for a single one of the plurality of radio band resources.

19. The computer readable memory of claim 17, wherein the indication of the compound signal quality metric comprises a gain applied to a downlink channel quality parameter measured by a relay node that receives the indications of channel quality experienced by the user equipments.

20. The computer readable memory of claim 17, wherein the buffer underload or the buffer overload is a percentage value.

21. An apparatus comprising:
a relay node further comprising:
receiving means for receiving from a plurality of user equipments indications of channel quality experienced by the user equipments and for receiving a grant from the access node of radio band resources that are available for allocation to the user equipments;
processing means for allocating to the user equipments at least some of the radio band resources and for aggregating the indications received from the plurality of user equipments into a compound signal quality metric and for monitoring a buffer status of an apparatus buffer which comprises individual buffers for each of the plurality of user equipments, wherein the received indications are at the relay node and are specific for a radio band resource allocated to the respective user equipment; and
transmit means for sending a combination of an indication of the compound signal quality metric and a further indication of the buffer status to an access node that controls a cell in which the user equipments operate,
wherein the apparatus comprises a relay node, and wherein the further indication of the buffer status comprises a buffer overload or a buffer underload state determined by the processing means using prediction individually for one or more of the plurality of user equipments based on the compound signal quality metric.

22. A method comprising:
receiving at an apparatus which comprises a relay node a grant from the access node of radio band resources that are available for allocation to the user equipments; and
allocating by the apparatus in a first instance radio resources to a relay node for allocating by the relay node to the user equipments and for use by user equipments under control of the relay node;
receiving by the apparatus from the relay node a combination of a compound signal quality metric that aggregates channel quality experienced on links between the user equipments and the relay node and an indication of the buffer status of a relay node buffer which comprises individual buffers for each of the plurality of user equipments, wherein the indication is received at the relay node and are specific for a radio band resource allocated to the respective user equipment, and wherein the further indication of the buffer status comprises a buffer overload or a buffer underload state determined individually for one or more of the plurality of user equipments by prediction based on the compound signal quality metric;
deciding by the apparatus a new allocation of radio resources based at least in part on the compound channel quality metric and on the indication of the buffer status; and
allocating by the apparatus in a second instance the new allocation of radio resources to the relay node.

23. An apparatus comprising:
a relay node configured to receive a grant from the access node of radio band resources that are available for allocation to the user equipments; and to allocating to the user equipments at least some of the radio band resources;
a transmitter configured to send to a relay node in a first instance radio resources for use by user equipments under control of the relay node;
a receiver configured to receive from the relay node a combination of a compound signal quality metric that aggregates channel quality experienced on links between the user equipments and the relay node and an indication of the buffer status of a relay node buffer which comprises individual buffers for each of the plurality of user equipments, wherein the indications are received at the relay node and are specific for a radio band resource allocated to the respective user equipment, and wherein the further indication of the buffer status comprises a buffer overload or a buffer underload state determined individually for one or more of the plurality of user equipments by prediction based on the compound signal quality metric;

a processor configured to decide a new allocation of radio resources based at least in part on the received compound channel quality metric and on the indication of the buffer status; and the transmitter is further to send to the relay node in a second instance the new allocation of radio resources.

* * * * *